United States Patent
Xia et al.

(10) Patent No.: US 8,208,811 B2
(45) Date of Patent: Jun. 26, 2012

(54) NETWORK WITH SOURCELESS CLIENTS

(75) Inventors: Tiejun J. Xia, Richardson, TX (US); Glenn A. Wellbrock, Wylie, TX (US)

(73) Assignee: Verizon Business Global LLC, Basking Ridge, NJ (US)

(*) Notice: Subject to any disclaimer, the term of this patent is extended or adjusted under 35 U.S.C. 154(b) by 1229 days.

(21) Appl. No.: 11/298,823

(22) Filed: Dec. 12, 2005

(65) Prior Publication Data

US 2007/0133998 A1 Jun. 14, 2007

(51) Int. Cl.
*H04J 14/00* (2006.01)

(52) U.S. Cl. ............. 398/72; 398/71; 398/70; 398/155; 398/188

(58) Field of Classification Search ................ 398/155, 398/154, 150, 188, 124, 202, 66–72, 211, 398/176, 186
See application file for complete search history.

(56) References Cited

U.S. PATENT DOCUMENTS

| | | | | |
|---|---|---|---|---|
| 5,864,625 A * | 1/1999 | Rutledge | ........................... | 380/31 |
| 5,999,287 A * | 12/1999 | Davies et al. | .................... | 398/98 |
| 6,639,893 B1 * | 10/2003 | Chikenji et al. | .............. | 370/217 |
| 7,016,608 B1 * | 3/2006 | Ball et al. | ........................ | 398/71 |
| 7,079,768 B2 * | 7/2006 | Ruan et al. | ....................... | 398/58 |
| 7,389,048 B2 * | 6/2008 | Kani et al. | ....................... | 398/72 |
| 7,519,294 B2 * | 4/2009 | Bullock | ........................... | 398/59 |
| 7,590,139 B2 * | 9/2009 | Boyd et al. | ...................... | 370/442 |
| 7,609,967 B2 * | 10/2009 | Hochbaum et al. | .............. | 398/67 |
| 7,787,722 B2 * | 8/2010 | Lavillonniere et al. | ......... | 385/24 |
| 7,974,533 B2 * | 7/2011 | Wellbrock et al. | .............. | 398/82 |
| 8,041,217 B2 * | 10/2011 | Bouda | .............................. | 398/75 |
| 2001/0017866 A1 * | 8/2001 | Takada et al. | .................. | 370/535 |
| 2004/0103275 A1 * | 5/2004 | Ji et al. | ........................... | 713/150 |
| 2004/0141759 A1 * | 7/2004 | Stiscia et al. | .................. | 398/168 |
| 2004/0208649 A1 * | 10/2004 | Matthews et al. | ............. | 398/195 |
| 2005/0019033 A1 * | 1/2005 | Oh et al. | ......................... | 398/58 |
| 2005/0053085 A1 * | 3/2005 | Doh et al. | ...................... | 370/431 |
| 2005/0069319 A1 * | 3/2005 | Pfeiffer | ............................ | 398/72 |
| 2005/0111854 A1 * | 5/2005 | Miyazaki | ....................... | 398/188 |
| 2005/0129402 A1 * | 6/2005 | Kim et al. | ........................ | 398/79 |
| 2005/0175344 A1 * | 8/2005 | Huang et al. | ................... | 398/79 |
| 2005/0249500 A1 * | 11/2005 | Liaw et al. | ....................... | 398/70 |
| 2006/0140631 A1 * | 6/2006 | Brolin | ............................. | 398/79 |
| 2007/0122151 A1 * | 5/2007 | Watanabe | ....................... | 398/69 |
| 2008/0056719 A1 * | 3/2008 | Bernard et al. | ................. | 398/71 |
| 2009/0162065 A1 * | 6/2009 | Mizutani et al. | ................ | 398/66 |
| 2009/0245792 A1 * | 10/2009 | Oishi et al. | ...................... | 398/66 |
| 2010/0226649 A1 * | 9/2010 | Cheng et al. | .................... | 398/72 |
| 2011/0262139 A1 * | 10/2011 | Costa et al. | ..................... | 398/66 |
| 2012/0045210 A1 * | 2/2012 | Kim et al. | ........................ | 398/66 |

OTHER PUBLICATIONS

"An Optical Network Unit for WDM Access Networks With Downstream DPSK and Upstream Remodulated OOK Data Using Injection-Locked FP Laser" by Wai Hung, Chun-Kit Chan, Member, IEEE, Lian-Kuan Chen, Member, IEEE, and Frank Tong @ 2003.*

An Optical Network Unit for WDM Access Networks With Downstream DPSK and Upstream Remodulated OOK Data Using Injection-Locked FP Laser by Wai Hung, Chun-Kit Chan, Member, IEEE, Lian-Kuan Chen, Member, IEEE, and Frank Tong @ 2003.*

(Continued)

*Primary Examiner* — Kenneth N Vanderpuye
*Assistant Examiner* — Hibret Woldekidan

(57) ABSTRACT

A first node receives a first phase modulated optical signal at a first wavelength from a master node. The first node also transmits a first amplitude modulated optical signal to the master node at the first wavelength using a portion of the first phase modulated optical signal as a light source.

15 Claims, 11 Drawing Sheets

OTHER PUBLICATIONS

Hung et al(An Optical Network Unit for WDM Access Networks With Downstream DPSK and Upstream Remodulated OOK Data Using Injection-Locked FP Laser Wai Hung, Chun-Kit Chan, Member, IEEE, Lian-Kuan Chen, Member, IEEE, and Frank Tong).*

An Optical Network Unit for WDM Access Networks With Downstream DPSK and Upstream Remodulated OOK Data Using Injection_Locked FP Laser_Wai Hung, Chun-Kit Chan, Member, IEEE, Lian-Kuan Chen, Member, IEEE, and Frank Tong. Issued on Oct. 2003.*

* cited by examiner

NETWORK WITH SOURCELESS CLIENTS

FIELD OF THE INVENTION

Implementations consistent with the principles of the invention relate generally to communications networks and, more particularly, to transmitting data in a communications network.

BACKGROUND OF THE INVENTION

A common network architecture for carrier networks is the master-client fiber ring network architecture. In this network architecture, the master node communicates with the client node using a specified wavelength. Each client node in the fiber ring network uses a different wavelength to avoid wavelength conflicts. As a result, each client node uses a different optical module, which is not convenient for equipment installation or repair. Moreover, network planning becomes difficult because the network planner needs to continually track the wavelengths used by each client node so that conflicts can be avoided.

SUMMARY OF THE INVENTION

In an implementation consistent with the principles of the invention, a device includes a splitter, a receiver, and a transmitter. The splitter receives a phase modulated optical signal from a remote device, and splits the phase modulated optical signal into a first portion and a second portion. The receiver receives the first portion from the splitter and recovers first data from the first portion. The transmitter receives the second portion from the splitter and uses the second portion to transmit second data to the remote device.

In another implementation consistent with the principles of the invention, a method includes receiving a phase modulated optical signal, recovering first data from a first portion of the phase modulated optical signal, and amplitude modulating a second portion of the phase modulated optical signal for transmitting second data.

In yet another implementation consistent with the principles of the invention, a system includes a master node configured to transmit phase modulated optical signals at a group of wavelengths. The system further includes a group of client nodes. Each client node is configured to receive one phase modulated optical signal of the transmitted phase modulated optical signals at one wavelength of the group of wavelengths, recover first data from the one phase modulated optical signal, and transmit second data to the master node at the one wavelength by amplitude modulating a portion of the one phase modulated optical signal.

In still another implementation consistent with the principles of the invention, a method includes receiving, via a first node, a first phase modulated optical signal at a first wavelength from a master node; and transmitting, via the first node, a first amplitude modulated optical signal to the master node at the first wavelength using a portion of the first phase modulated optical signal as a light source.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide generic client nodes that utilize downstream transmissions of a master node for transmitting data back to the master node. In one implementation, different modulation schemes are utilized for the downstream and upstream transmissions.

Exemplary System

Figure 1:
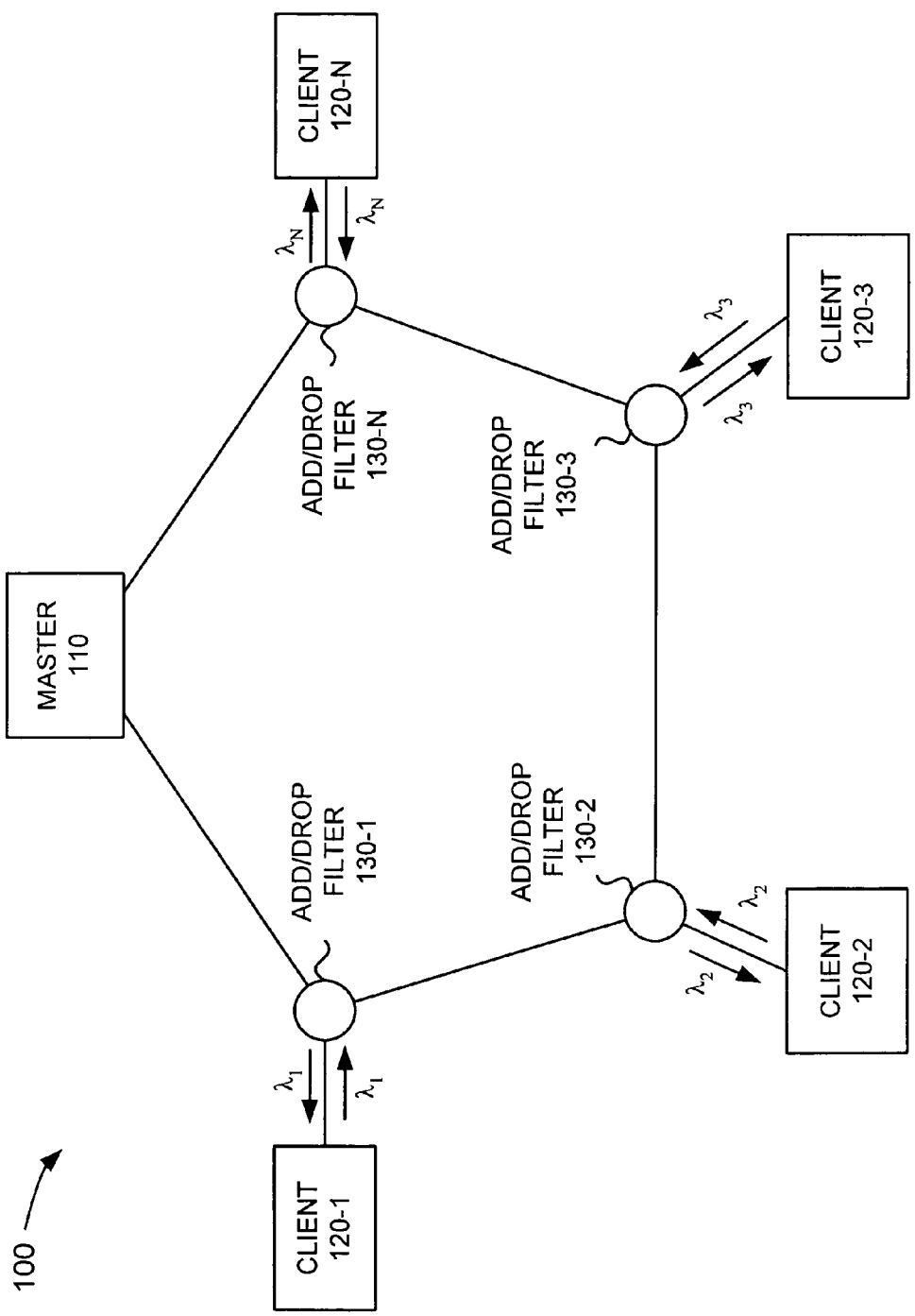
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a master 110 and a group of clients 120-1 through 120-N (referred to collectively hereinafter as "clients 120") that connect via a group of add/drop filters 130-1 through 130-N (referred to collectively hereinafter as "add/drop filters 130"). The number of masters, clients, and add/drop filters illustrated in FIG. 1 is provided for simplicity. In practice, a typical system could include more or fewer masters, clients, and/or add/drop filters than illustrated in FIG. 1.

Master 110 may include one or more devices capable of transmitting data to and receiving data from clients 120. In one implementation, master 110 may include a server, a router, a switch, or other types of devices that transmit and receive data. Although not shown in FIG. 1, master 110 may be a pathway or a gateway via which clients 120 connect to a network, such as a local area network (LAN), a wide area network (WAN), a public switched telephone network (PSTN), an intranet, the Internet, and/or some combination of these networks or other networks. In one implementation consistent with the principles of the invention, master 110 may be part of a central office. Master 110 may, for example, connect to add/drop filters 130 via optical connections.

Clients 120 may include devices capable of receiving data from and transmitting data to master 110. In one implementation consistent with the principles of the invention, clients 120 may include customer premises equipment (CPE), such as, for example, digital subscriber line (DSL) modems, cable modems, set-top boxes, a switching device, a routing device, etc. As will be described in greater detail below, clients 120 may not include light sources (e.g., lasers). Instead, clients 120 may use optical signals received from master 110 to transmit data back to master 110. In this way, each client 120-1 through 120-N transmits data at the wavelength at which data is received from master 110, as illustrated in FIG. 1. Clients 120 may, for example, connect to add/drop filters 130 via optical connections.

Add/drop filters 130 may include devices that add or drop individual channels. For example, suppose that master 110 communicates with client 120-1 at wavelength $\lambda_1$. Add/drop filter 130-1 may receive optical signals from master 110 and forward (or drop) only those signals having a wavelength of $\lambda_1$ to client 120-1. Add/drop filter 130-1 may also receive signals at wavelength $\lambda_1$ from client 120-1, add those signals to signals received from, for example, add/drop filter 130-2, and forward the combined signals to master 120. Add/drop filters 130 may be fixed filters (i.e., configured to filter a predetermined wavelength) or tunable filters (i.e., can be configured to filter a first wavelength and then re-tuned to filter a different wavelength).

Exemplary Master/Client Configuration

Figure 2:
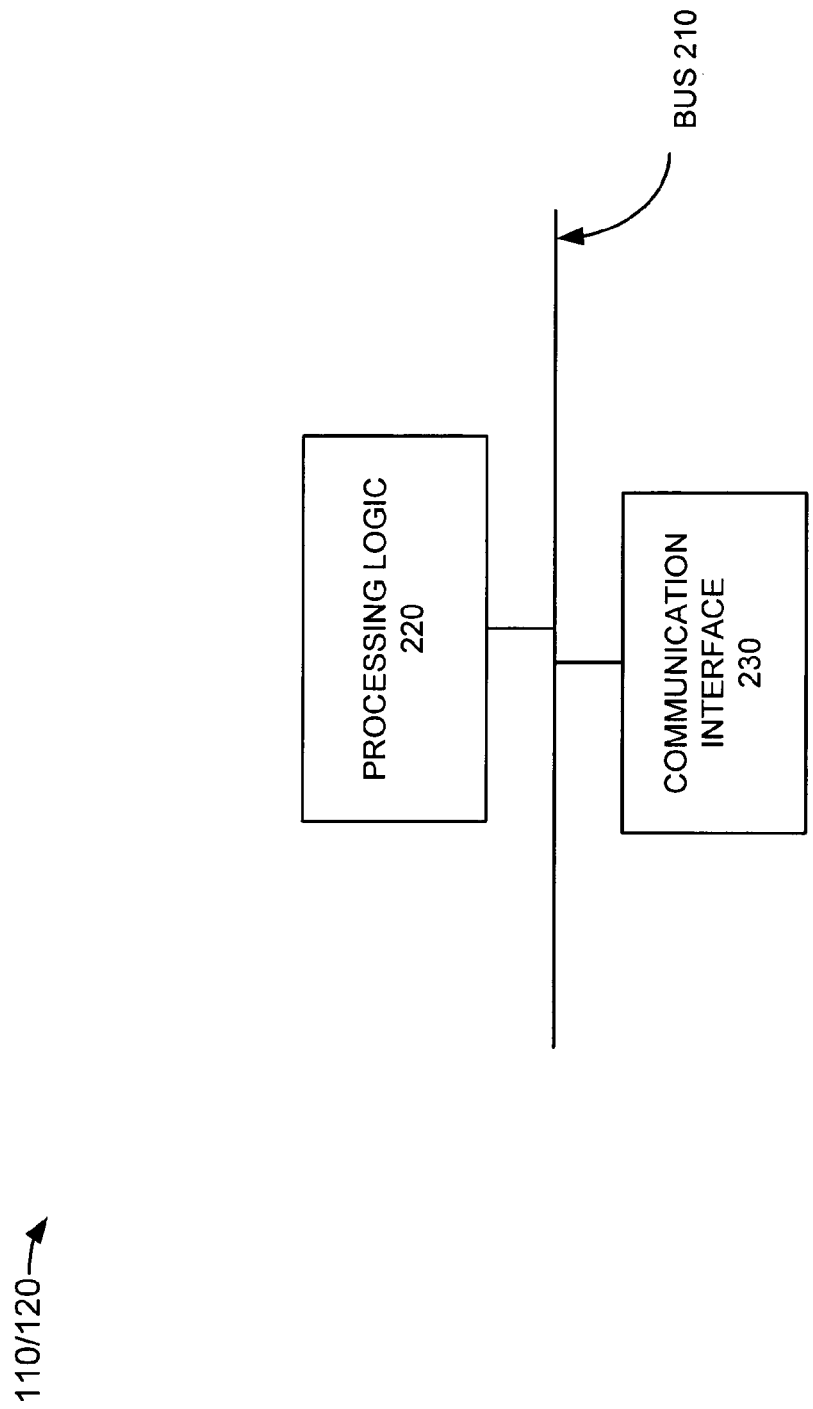
FIG. 2 illustrates an exemplary configuration of the master of FIG. 1 in an implementation consistent with the principles of the invention.

FIG. 2 illustrates an exemplary configuration of master 110 in an implementation consistent with the principles of the invention. Clients 120 may be similarly configured. As illustrated, master 110 may include a bus 210, processing logic 220, and a communication interface 230. It will be appreciated that master 110 may include other components (not shown) that aid in receiving, transmitting, and/or processing data. Moreover, it will be appreciated that other configurations are possible.

Bus 210 may permit communication among the components of master 110. Processing logic 220 may include any type of processor or microprocessor that interprets and executes instructions. In other implementations, processing logic 220 may be implemented as or include an application specific integrated circuit (ASIC), field programmable gate array (FPGA), or the like. Processing logic 220 may also include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Communication interface 230 may include any transceiver-like mechanism that enables master 110 to communicate with other devices and/or systems. For example, communication interface 110 may include mechanisms for communicating with clients 120 and mechanisms for communication with other devices via a network, such as a LAN, WAN, the PSTN, an intranet, and/or the Internet.

As will be described in detail below, master 110, consistent with the principles of the invention, may transmit data to and receive data from clients 120. Master 110 may perform these and other functions in response to processing logic 220 executing software instructions contained in a computer-readable medium, such as a memory. A computer-readable medium may be defined as one or more memory devices and/or carrier waves. The software instructions may be read into the memory from another computer-readable medium or from another device via communication interface 230. The software instructions may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 3:
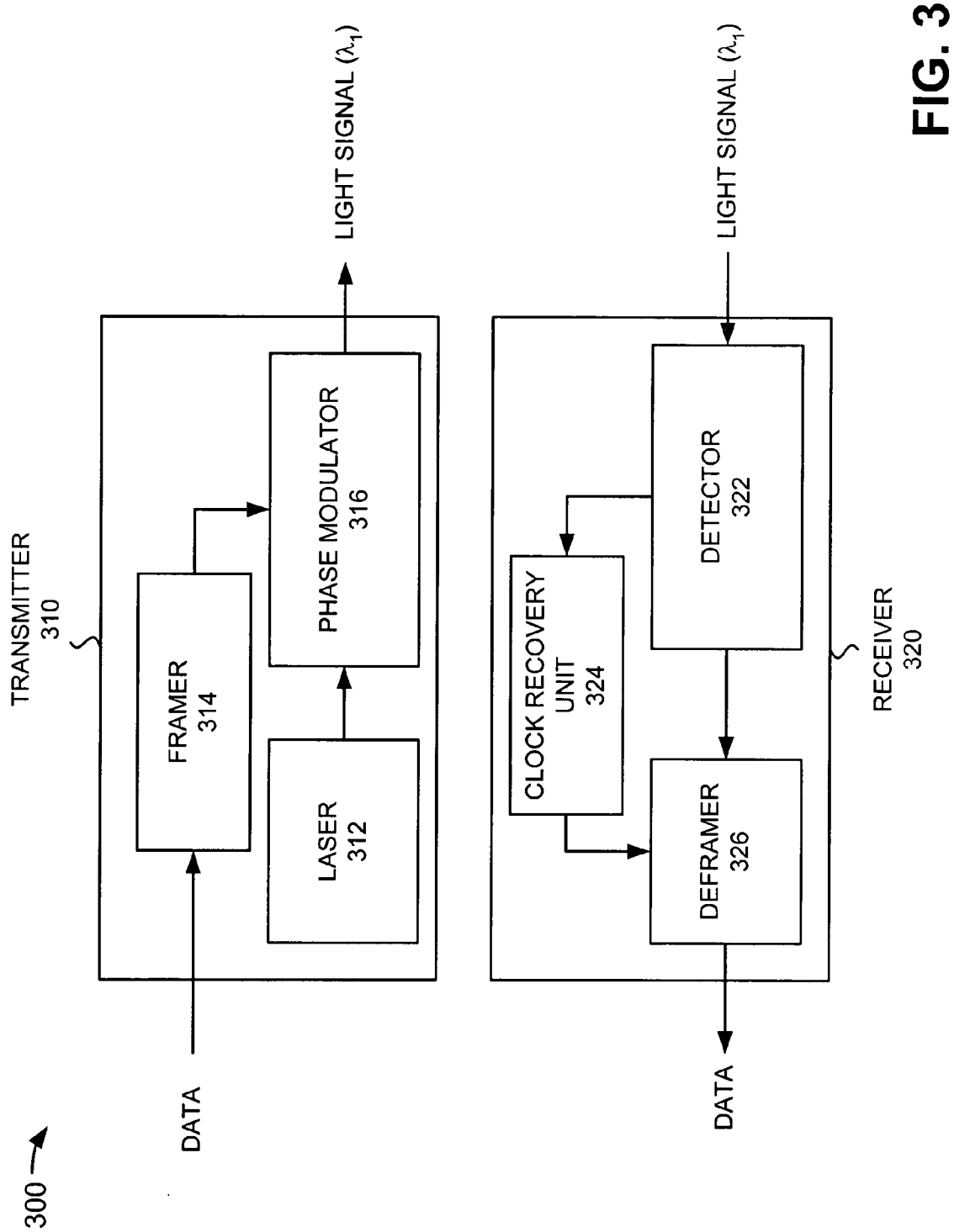
FIG. 3 illustrates an exemplary configuration of a communication interface of the master of FIG. 1 in an implementation consistent with the principles of the invention.

FIG. 3 illustrates an exemplary configuration of a communication interface 300 of master 110 in an implementation consistent with the principles of the invention. As illustrated, communication interface 300 may include a transmitter 310 and a receiver 320. Although a single transmitter/receiver pair 310/320 is illustrated in FIG. 3, it will be appreciated that communication interface 300 may include more than one transmitter/receiver pair 310/320. For instance, in one exemplary implementation consistent with the principles of the invention, the number of transmitter/receiver pairs 310/320 may relate to the number of clients 120 in system 100 or the number clients capable of being supported in system 100. Moreover, it will be appreciated that communication interface 300 may include components other than those illustrated in FIG. 3 that aid in the receiving, transmitting, and/or processing of data.

Transmitter 310 may include a laser 312, a framer 314, and a phase modulator 316. Laser 312 may include a photon source that produces photons according to instructions and/or signals provided by processing logic 220. Laser 312 may produce photons of light at a specific wavelength in the electromagnetic spectrum, including light in the human visible spectrum and light beyond the human-visible spectrum, such as, for example, infrared or ultraviolet light. As illustrated in FIG. 1, it is assumed that laser 312 may produce photons of light at a wavelength of $\lambda_1$. In one implementation, laser 312 may be a tunable laser. Framer 314 may receive data from, for example, processing logic 220 and control phase modulator 316 to cause the data to be transmitted from master 110. Phase modulator 316 may phase modulate the photons of light received from laser 312 in a well known manner according to control signals from framer 314. Phase modulator 316 may include a Mach-Zehnder optical modulator or other known modulator. In one implementation consistent with the principles of the invention, phase modulator 316 may provide differential phase shift keying (DPSK) of an optical signal. Other phase modulation techniques may alternatively be used.

Receiver 320 may include a detector 322, a clock recovery unit 324, and a deframer 326. Detector 322 may include a device that receives an optical signal and converts the optical signal to an electrical signal. In one implementation, detector 322 may include a photodiode. Detector 322 may forward the electrical signal to clock recovery unit 324 and deframer 326. Clock recovery unit 324 may include a device that receives the electrical signal from detector 322 and recovers a clock signal from the electrical signal in a well known manner. Deframer 326 operates in conjunction with detector 322 and clock recovery unit 324 to recover the data from the optical signal received by detector 322. Deframer 326 may forward the recovered data to, for example, processing logic 220 for processing.

Figure 4:
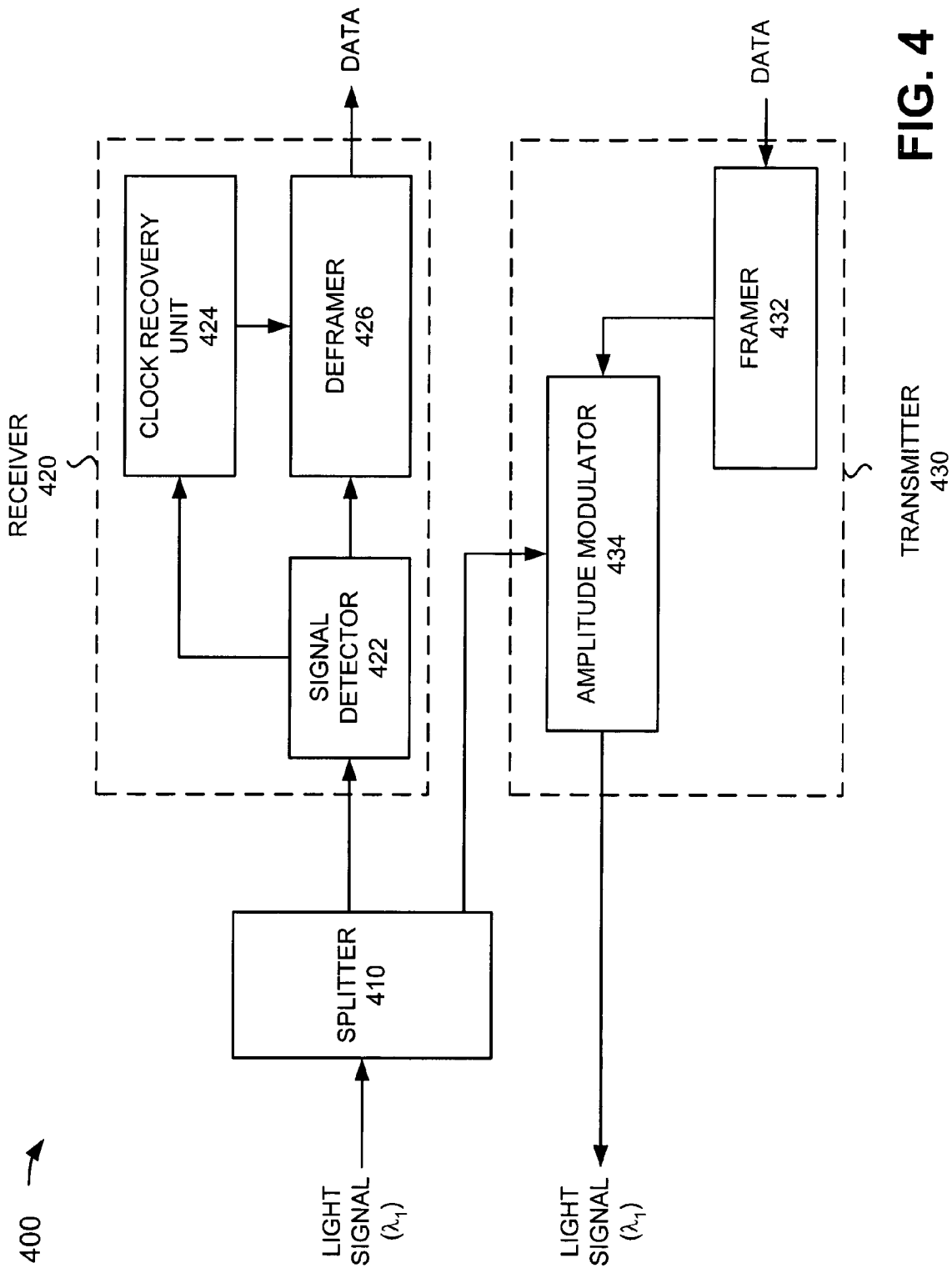
FIG. 4 illustrates an exemplary configuration of a communication interface of a client of FIG. 1 in an implementation consistent with the principles of the invention.

FIG. 4 illustrates an exemplary configuration of a communication interface 400 of a client, such as client 120-1, in an implementation consistent with the principles of the invention. As illustrated, communication interface 400 may include a splitter 410, a receiver 420, and a transmitter 430. It will be appreciated that communication interface 400 may include components other than those illustrated in FIG. 4 that aid in the receiving, transmitting, and/or processing of data.

Splitter 410 may receive an optical signal and split the optical signal into a first component and a second component. It is assumed, for explanatory purposes, that the optical signal is received at a wavelength of $\lambda_1$. Splitter 410 may split the optical signal according to a predetermined ratio. Splitter 410 may forward the first part of the optical signal to receiver 420 and the second part of the optical signal to transmitter 430. In one implementation consistent with the principles of the invention, splitter 410 may include a power splitter.

Receiver 420 may include a signal detector 422, a clock recovery unit 424, and a deframer 426. Signal detector 422 may include a device that receives the first component of the split optical signal from splitter 410 and converts the optical signal to an electrical signal. In one implementation, signal detector 422 may include a phase signal detector that includes, for example, a 1 bit delay component and a photodiode. Signal detector 422 may forward the electrical signal to clock recovery unit 424 and deframer 426. Clock recovery unit 424 may include a device that receives the electrical signal from signal detector 422 and recovers a clock signal from the electrical signal in a well known manner. Deframer 426 operates in conjunction with signal detector 422 and clock recovery unit 424 to recover the data from the optical signal received by signal detector 422. Deframer 426 may forward the recovered data to, for example, processing logic 220 for processing.

Transmitter 430 may include a framer 432 and an amplitude modulator 434. Framer 432 may receive data from, for example, processing logic 220 and control amplitude modulator 434 to cause the data to be transmitted from client 120. Amplitude modulator 434 may receive the second component of the split optical signal from splitter 410 and amplitude modulate the second component of the split optical signal from splitter 410 according to control signals from framer 432. Amplitude modulator 434 may include a semiconductor optical amplifier (SOA) or other known modulator. In one implementation consistent with the principles of the invention, amplitude modulator 434 may provide on-off keying (OOK) of an optical signal. Other amplitude modulation techniques may alternatively be used. Since transmitter 430 uses the optical signal received from master 110 as the light source for transmitting data to master 110, the wavelength at which client 120-1 transmits data to master 110 matches the wavelength at which master 110 transmits data to client 120-1.

Exemplary Processing

Figure 5:
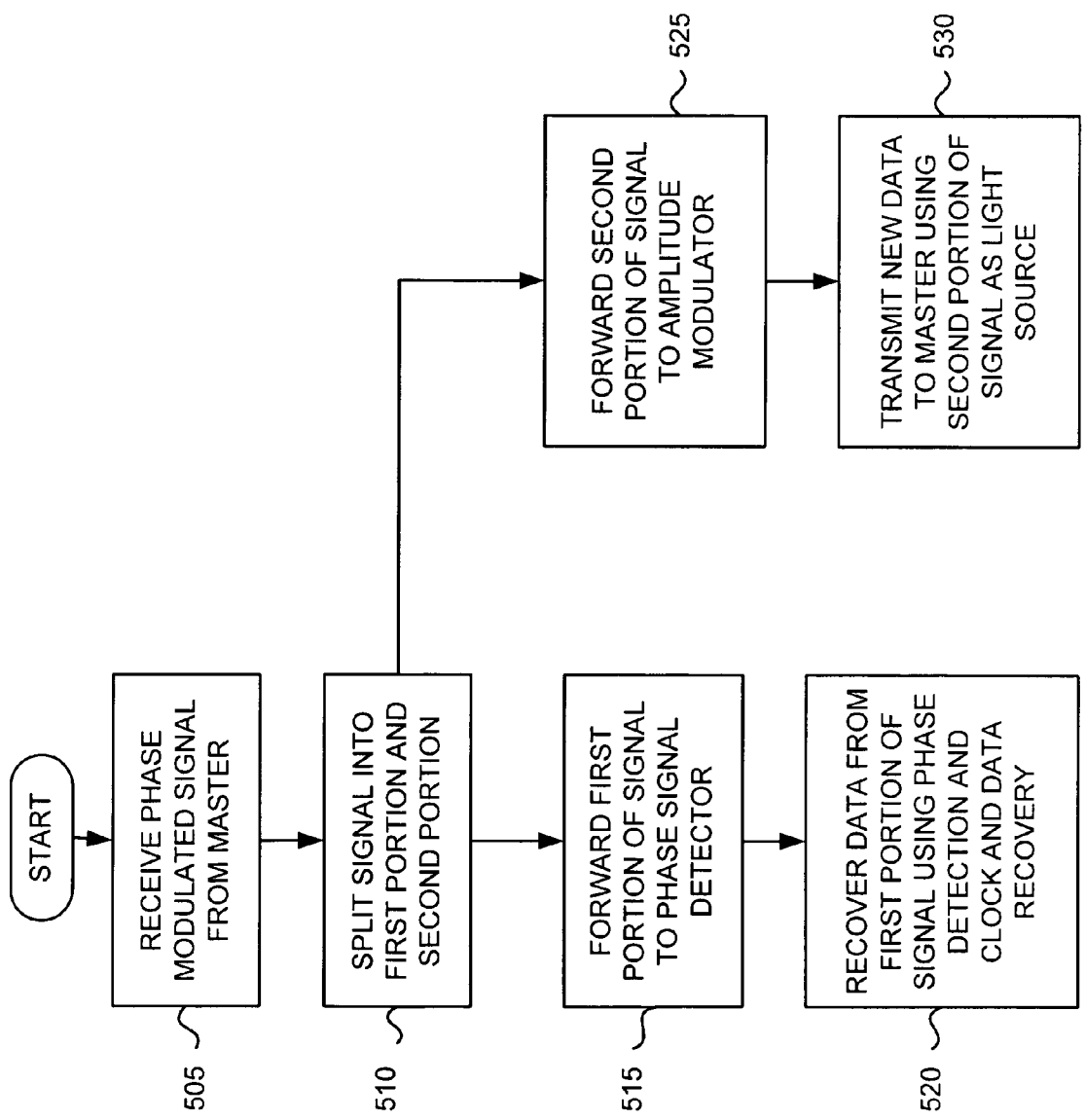
FIG. 5 illustrates an exemplary process for transmitting data to the master of FIG. 1 in an implementation consistent with the principles of the invention.

FIG. 5 illustrates an exemplary process for transmitting data to master 110 in an implementation consistent with the principles of the invention. For explanatory purposes, it will be assumed hereinafter that the processing described in FIG. 5 is performed by client 120-1.

Processing may begin by receiving a phase modulated optical signal from master 110 (act 505). In one implementation consistent with the principles of the invention, master 110 may transmit the optical signal using DPSK modulation. Other phase modulation techniques may alternatively be used.

The phase modulated optical signal may be split into a first portion and a second portion (act 510) using, for example, splitter 410. Splitter 410 may split the phase modulated optical signal into equal or unequal portions. The first portion of the split optical signal may be forwarded to a phase signal detector, such as signal detector 422 (act 515). Data may be recovered from the first portion of the split optical signal (act 520). For example, phase detection and clock and data recovery may be performed in a well known manner on the first portion of the split optical signal to recover the data.

The second portion of the split optical signal may be forwarded to an amplitude modulator, such as amplitude modulator 434 (act 525). New data may be transmitted from client 120-1 to master 110 using the second portion of the split optical signal as a light source (act 530). For example, framer 432 may receive new data to be transmitted and control amplitude modulator 434 to modulate the second portion of the split optical signal to transmit the new data to master 110. Framer 432 may operate based on a clock signal. In one implementation, the clock signal may include the clock signal recovered from the first portion of the split optical signal.

Exemplary Implementation

Figure 6:
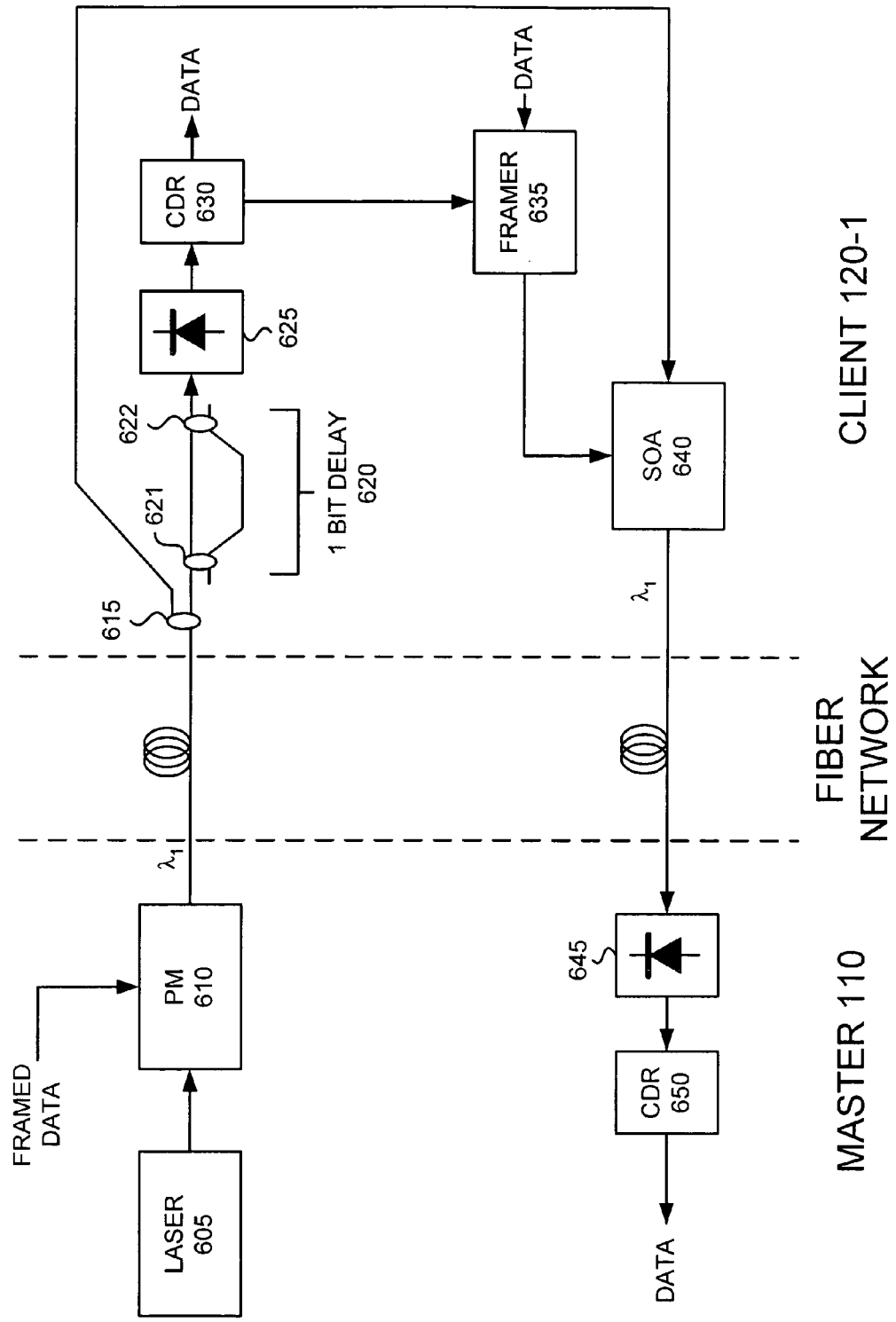
FIG. 6 illustrates an exemplary transmission of data between a master and a client in an implementation consistent with the principles of the invention.

FIG. 6 illustrates an exemplary transmission of data between master 110 and client 120-1 in an implementation consistent with the principles of the invention. It will be appreciated that data may be transmitted between master 110 and clients 120-2 through 120-N in a similar manner.

As illustrated in FIG. 6, a phase modulator 610 may phase modulate the light from laser 605 in response to receipt of framed data from, for example, a framer (not shown). Master 110 may transmit the phase modulated signal to client 120-1 via the fiber network.

Figure 7:
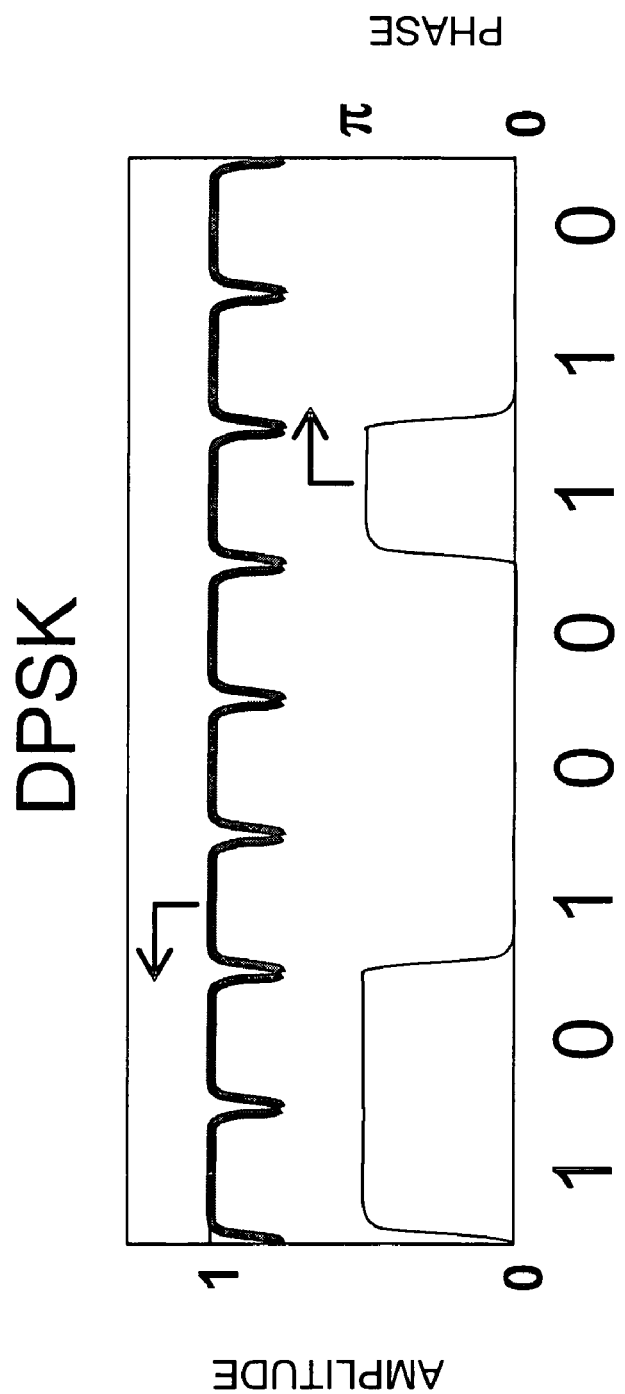
FIG. 7 illustrates an exemplary differential phase-shift keying (DPSK) modulated signal that may be transmitted from a master to a client in an implementation consistent with the principles of the invention.

FIG. 7 illustrates an exemplary DPSK modulated signal that may be transmitted from master 110 to client 120-1 in an implementation consistent with the principles of the invention. As illustrated, the amplitude of the DPSK modulated signal is relatively constant and the phase varies between 0 and $\pi$ based on the occurrence of a 1 bit. For example, the occurrence of a 1 bit causes the phase to change from 0 to $\pi$ or from $\pi$ to 0.

Returning to FIG. 6, client 120-1 may receive the phase modulated signal and may split the signal into a first portion and a second portion using splitter 615. The first portion of the split signal is forwarded to a 1 bit delay unit 620. 1 bit delay unit 620 includes two couplers 621 and 622. Coupler 621 splits the power of the first portion of the split signal into equal portions. Half of the power is forwarded to coupler 622 and the other half of the power is delayed by 1 bit in reaching coupler 622. When the two halves meet at coupler 622, there is interference since the 1 bit delayed portion interferes with the next bit. In this way, the amplitude modulation of the signal can be recovered using photodiode 625. The data from master 110 can then be recovered using clock and data recovery unit 630, which recovers a clock signal and data from the first portion of the split optical signal.

When client 120-1 has data to transmit to master 110, the data may be forwarded to framer 635. Framer 635 also receives a clock signal from clock and data recovery unit 630. Thus, client 120-1 uses the same clock for receiving and transmitting data. Based on the received data and the clock signal, framer 635 controls SOA 640 to transmit data back to master 110. SOA 640 receives the second portion of the split signal and uses this signal as the light source for transmitting data back to master 110. Thus, there is no need for client 120-1 to include a light source. In this way, client 120-1 transmits data at the same wavelength $\lambda_1$ used by master 110 to transmit data to client 120-1. Therefore, there is no need for client 120-1 to remember (e.g., store) the wavelength to use since the wavelength that will be used will always follow the wavelength used by master 110, thus making client 120-1 universal (or generic). Moreover, since the light sources are housed and controlled purely by master 110, network planning, installation, and configuration is dramatically simplified, as there is no need to change the optics at the client side.

SOA 640 performs amplitude modulation for transmitting the data to master 110. In one implementation, SOA 640 performs OOK modulation. Other amplitude modulation techniques may alternatively be used.

Figure 8:
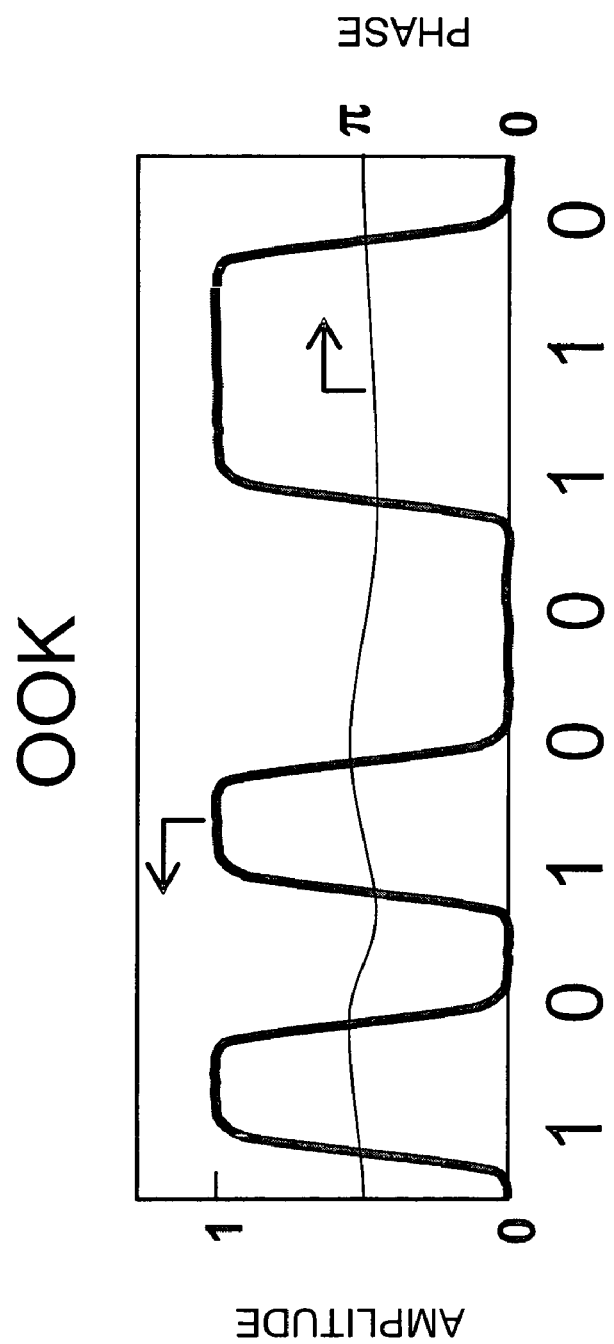
FIG. 8 illustrates an exemplary on-off keying (OOK) modulated signal that may be transmitted from a client to a master in an implementation consistent with the principles of the invention.

FIG. 8 illustrates an exemplary OOK modulated signal that may be transmitted from client 120-1 to master 110 in an implementation consistent with the principles of the invention. As illustrated, the phase of the OOK modulated signal is relatively constant and the amplitude varies between 0 and 1 based on the bit being transmitted. For example, the occurrence of a 1 bit causes the amplitude to go to (or remain at) 1 and the occurrence of a 0 bit causes the amplitude to go to (or remain at) 0.

Returning to FIG. 6, master 110 may receive the amplitude modulated signal from client 120-1. Master 110 may recover the data from the amplitude modulated signal using, for example, photodiode 645 and clock and data recovery (CDR) unit 650.

Figure 9B:
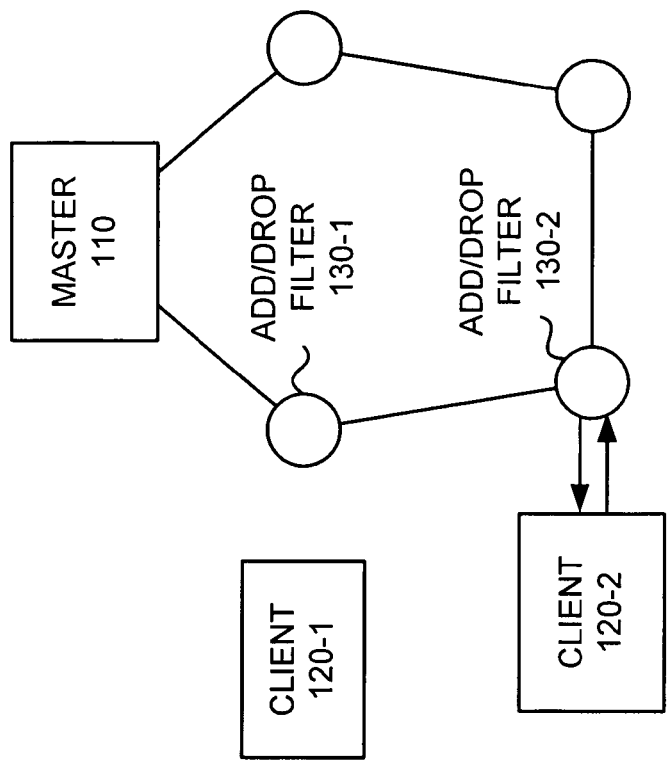
FIGS. 9A and 9B illustrate an exemplary process of re-directing traffic in an implementation consistent with the principles of the invention.
Figure 9A:
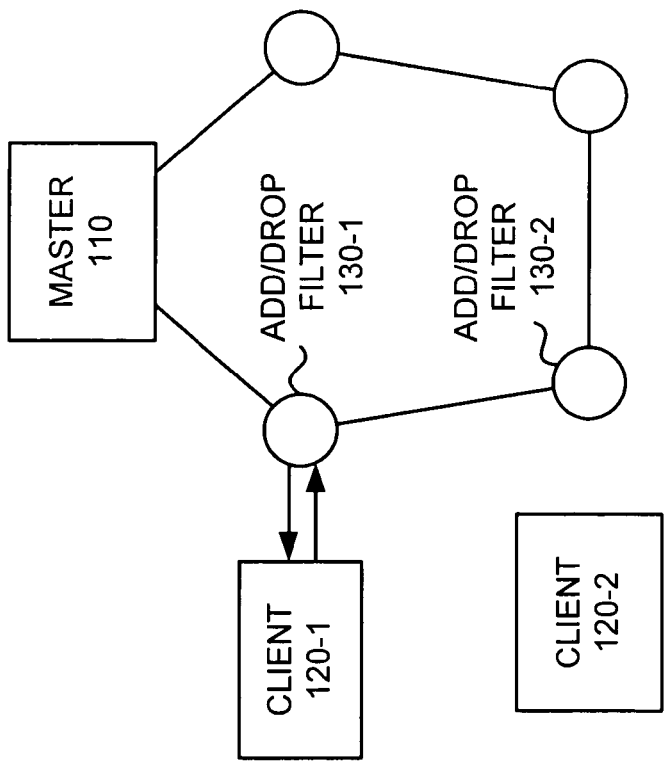

FIGS. 9A and 9B illustrate an exemplary process of re-directing traffic in an implementation consistent with the principles of the invention. In this example, assume that master 110 collects the most traffic from client 120-1 at wavelength $\lambda_1$ during the day (e.g., client 120-1 may be associated with a business for which the bulk of its traffic is transmitted/received during the day) and the most traffic from client 120-2 at wavelength $\lambda_2$ at night (e.g., client 120-2 may be associated with a residence for which the bulk of its traffic is transmitted/received at night). Therefore, to change the wavelength from client 120-1 to client 120-2, as shown in FIGS. 9A and 9B, one would only need to change the wavelength at master 110 since the wavelength used by clients 120-1 and 120-2 follow the wavelength used by master 110.

In some situations, an add/drop filter may be tunable to allow for a different wavelength to be dropped to the client that connects to that add/drop filter. In these situations, master 110 may use the same wavelength in the example above for communicating with clients 120-1 and 120-2. For example, assume that during the day, master 110 communicates with client 120-1 at wavelength $\lambda_1$. During this time, add/drop filter 130-1 may forward signals at a wavelength of $\lambda_1$ to client 120-1. As some later time (e.g., in the evening), add/drop filter 130-1 may be tuned to a different wavelength (e.g., $\lambda_M$) and add/drop filter 130-2 may be tuned to wavelength $\lambda_1$. Thereafter, master 110 may use wavelength $\lambda_1$ to communicate with client 120-2 since, as set forth above, the wavelengths that clients 120 use is dependent on the wavelength used by master 110.

Figure 10:
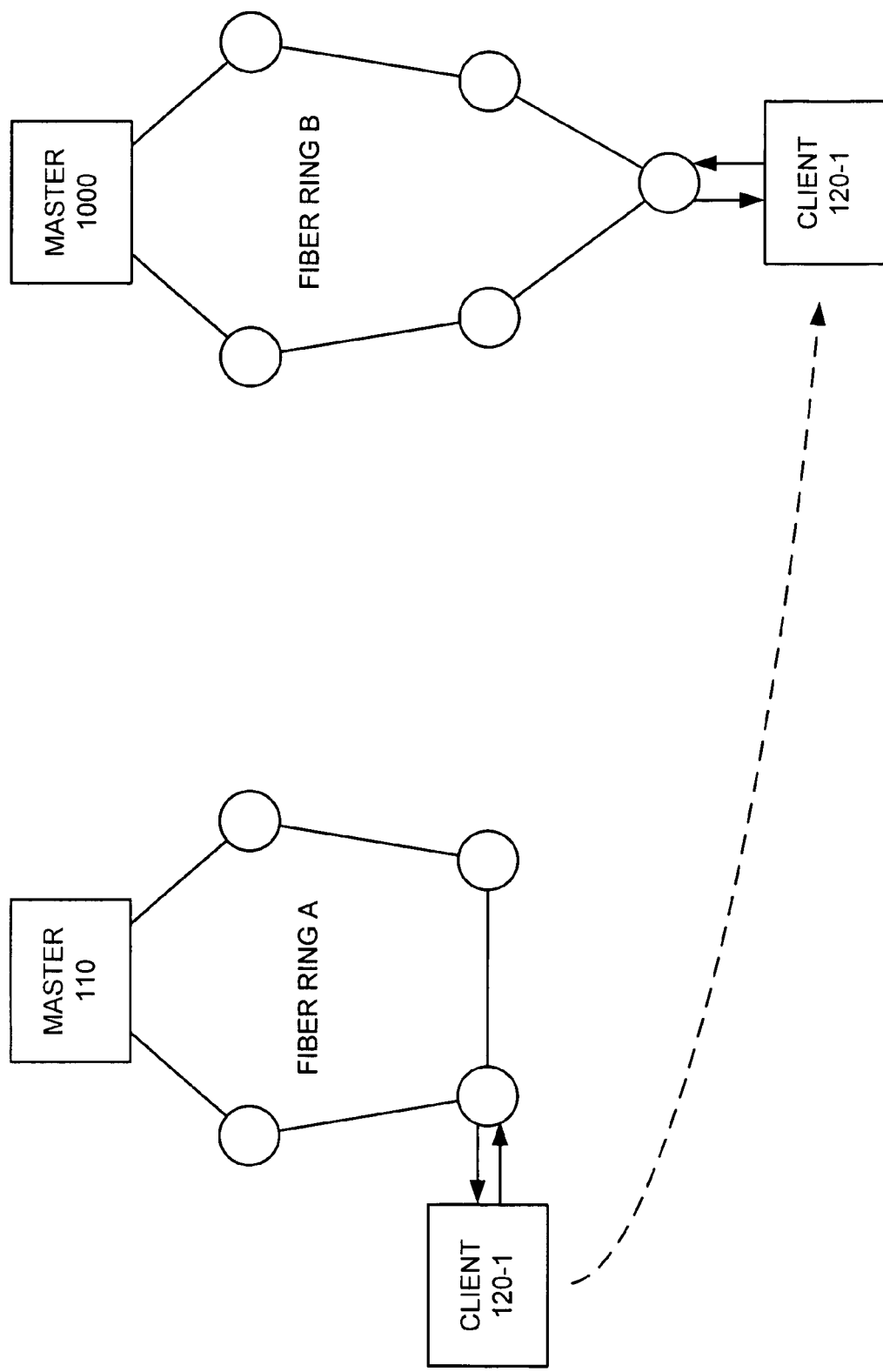
FIG. 10 illustrates an exemplary process of moving a client from one network to another network in an implementation consistent with the principles of the invention.

FIG. 10 illustrates an exemplary process of moving a client from one network to another network in an implementation consistent with the principles of the invention. As illustrated in FIG. 10, a client, such as client 120-1, may be easily moved from one add/drop filter associated with a first master (i.e., master 110) to a second add/drop filter associated with a second master (i.e., master 1000) since clients 120 are universal devices. Therefore, if client 120-1 is decommissioned, there is no need to discard client 120-1 since client 120-1 can be immediately moved to another location and used for another customer. Since the wavelengths used by clients 120 are dependent on the wavelengths used by master 110, clients 120 can be moved to any location, as illustrated in FIG. 10.

The use of add/drop filters (or other types of filters) may cause wavelength drifting. For example, add/drop filters are often temperature-dependent. Therefore, there are times when the add/drop filters need to be adjusted. This is often a difficult procedure since the add/drop filters are fixed and passive and often positioned underground. To improve this situation, the wavelength used by master 110 may be adjusted to follow the drifting.

Figure 11:
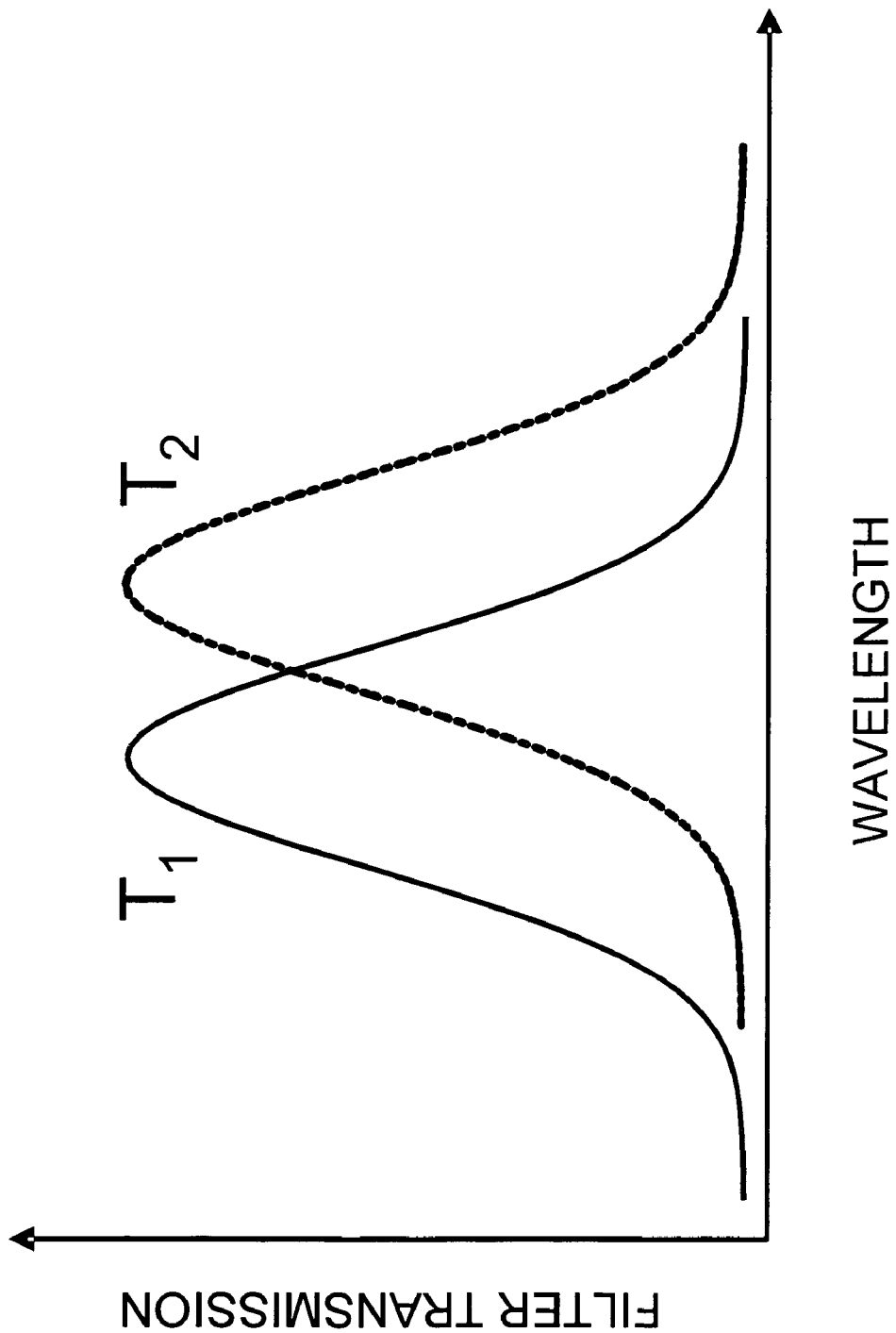
FIG. 11 illustrates exemplary wavelength drifting that may be experienced by an add/drop filter.

FIG. 11 illustrates exemplary wavelength drifting that may be experienced by an add/drop filter. e.g., add drop filter 130. As illustrated, the add/drop filter 130 may forward the wavelength denoted by $T_1$ when the add/drop filter 130 is operating at a first temperature and may forward the wavelength denoted by $T_2$ when the add/drop filter is operating at a second temperature. The wavelength used by master 110 may be adjusted to wavelength $T_2$ when the add/drop filter drifts to that wavelength. Thus, there would be no need to adjust the add/drop filters 130. Moreover, since clients 120 follow the wavelength used by master 110, the wavelengths used by clients 120 will be automatically adjusted when master 110 is adjusted.

CONCLUSION

Implementations consistent with the principles of the invention provide client nodes that utilize the light source from the master node to transmit data to the master node. Since the master node controls the wavelength going to specific client nodes, when the data flow changes, the client nodes can follow without changing the optics in the client nodes. Moreover, since the light sources are housed and controlled by the master node, network planning, installation, and reconfiguration is greatly simplified.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while a master-client network architecture is described above, it will be appreciated that the techniques described herein are equally applicable to other types of network architectures.

While a series of acts has been described with respect to FIG. 5, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
    a master node to transmit first data via phase modulated optical signals at a plurality of wavelengths; and
    a plurality of client nodes, where a first client node, of the plurality of client nodes, is to:
        receive one phase modulated optical signal of the transmitted phase modulated optical signals at one wavelength of the plurality of wavelengths, where the first client node, of the plurality of client nodes, is selected by the master node to receive, based on an amount of traffic received at the master node, the first data by the one phase modulated optical signal having the one wavelength from the first client node,
        recover the first data from the one phase modulated optical signal, and
        transmit second data to the master node at the one wavelength by amplitude modulating a portion of the one phase modulated optical signal; and
    where a second client node, of the plurality of client nodes, which is not selected by the master node to receive, based on an amount of traffic received at the master node, from the second client node, the first data by the one phase modulated optical signal having the one wavelength is automatically assigned to another master node.

2. The system of claim 1, where the plurality of client nodes includes customer premises equipment.

3. The system of claim 1, where the one phase modulated optical signal includes a differential phase-shift keying (DPSK) modulated optical signal.

4. The system of claim 3, where, when transmitting the second data, the first client node is to:
    amplitude modulate the portion of the one phase modulated optical signal using on-off keying (OOK) modulation.

5. The system of claim 1, where the first client node is further to:
    recover a clock signal from the one phase modulated optical signal, and
    use the clock signal when transmitting the second data.

6. The system of claim 1, where the master node is to transmit phase modulated optical signals at different wavelengths to each client node of the plurality of client nodes.

7. The system of claim 1, where when the first client node is to receive the phase modulated optical signal having the one wavelength, the master node is to change a wavelength, of the plurality of wavelengths, at which the master node transmits the first data, to the one wavelength based on a time of day that the first data is transmitted.

8. The system of claim 1, where the master node is to change a wavelength, of the plurality of wavelengths, at which the master node transmits the first data based on a temperature of an add/drop node located between the master node and one of the plurality of client nodes.

9. The system of claim 1, further comprising:
    at least one drop/add filter located between the master node and the first client node, where when the first client node is to receive the phase modulated optical signal having the one wavelength, the at least one drop/add filter is to filter the plurality of wavelengths, at which the master node transmits the first data, to allow only the one wavelength to pass through the at least one drop/add filter.

10. A method comprising:
    receiving, at a first node, a first phase modulated optical signal at a first wavelength from a master node;
    transmitting, via the first node, a first amplitude modulated optical signal to the master node at the first wavelength using a portion of the first phase modulated optical signal as a light source;
    receiving, at a second node and from the master node, a second phase modulated optical signal at a second wavelength, where the first wavelength is different than the second wavelength;
    transmitting, via the second node, a second amplitude modulated optical signal at the second wavelength to the master node using a portion of the second phase modulated optical signal as a light source;
    selecting between the first node and the second node by changing, using the master node, from the first phase modulated optical signal to the second phase modulated optical signal based on an amount of traffic received at the master node from the first node or the second node; and
    automatically assigning the unselected one of the first node or the second node to another master node.

11. The method of claim 10, where the first phase modulated optical signal includes a differential phase-shift keying (DPSK) modulated signal.

12. The method of claim 11, where the first amplitude modulated optical signal includes an on-off keying (OOK) modulated signal.

13. The method of claim 10, further comprising:
    receiving, via a third node and from the master node, a third phase modulated optical signal at a third wavelength, the third wavelength being different than the first wavelength; and
    transmitting, via the third node, a third amplitude modulated optical signal at the third wavelength to the master node using a portion of the third phase modulated optical signal as a light source.

14. The method of claim 10, further comprising:
    recovering data from the first phase modulated optical signal.

15. The method of claim 10, further comprising:
    receiving, via the first node and from a second master node, a third phase modulated optical signal at a third wavelength; and
    transmitting, via the first node, a third amplitude modulated optical signal at the third wavelength to the second master node using a portion of the third phase modulated optical signal as a light source.

* * * * *